US008577194B2

(12) United States Patent
Sicari et al.

(10) Patent No.: US 8,577,194 B2
(45) Date of Patent: Nov. 5, 2013

(54) METHODS AND SYSTEMS FOR EFFICIENT INSTALLATION OF CABLES IN WATERCRAFT

(71) Applicant: kSARIA Corporation, Methuen, MA (US)

(72) Inventors: Sebastian J. Sicari, Boxford, MA (US); Anthony J. Christopher, Andover, MA (US); Stavros Dariotis, Douglas, MA (US); Bruce S. Belanger, Milford, MA (US)

(73) Assignee: kSARIA Corporation, Methuen, MA (US)

( * ) Notice: Subject to any disclaimer, the term of this patent is extended or adjusted under 35 U.S.C. 154(b) by 0 days.

(21) Appl. No.: 13/652,345

(22) Filed: Oct. 15, 2012

(65) Prior Publication Data

US 2013/0036593 A1 Feb. 14, 2013

Related U.S. Application Data

(63) Continuation of application No. 13/560,543, filed on Jul. 27, 2012, which is a continuation of application No. 12/869,916, filed on Aug. 27, 2010, now Pat. No. 8,254,738.

(51) Int. Cl.
*G02B 6/44* (2006.01)
*H05K 13/00* (2006.01)
*H02G 15/00* (2006.01)
*H01R 43/00* (2006.01)

(52) U.S. Cl.
USPC ............ 385/100; 385/101; 29/825; 29/592.1; 174/74 R

(58) Field of Classification Search
USPC .............. 385/76, 77, 78, 100, 101, 102, 103, 385/104, 105, 106, 107, 108, 109, 110, 111, 385/112, 113, 114, 136, 137, 138, 139, 385/147; 174/650, 68.1, 68.3, 262, 70 R, 174/101.5, 74 R; 29/592.1, 825
See application file for complete search history.

(56) References Cited

U.S. PATENT DOCUMENTS 3,204,334 A 9/1965 Long
3,283,398 A 11/1966 Andren
(Continued)

FOREIGN PATENT DOCUMENTS

DE 2513680 A1 3/1975
EP 159768 2/1985
(Continued)

OTHER PUBLICATIONS

Department of Defense, Standard Practice, USA, "Fiber Optic Cable Topology Installation Standard Methods for Naval Ships (Connectors and Interconnections)" Part 5 of 7 Parts, Military Standard 2042-5B (SH) Jul. 25, 2002 Superseding Mil-STD-2042-5A (SH) Sep. 29, 1997 Mil-STD-2042-5 (SH) Jul. 7, 1993.

(Continued)

*Primary Examiner* — Brian Healy
(74) *Attorney, Agent, or Firm* — Choate, Hall & Stewart LLP; William R. Haulbrook; Daniel S. Matthews

(57) ABSTRACT

The present application is directed towards systems and methods for efficient installation of optical and electrical cable in watercraft. A manufacturer may terminate one end of a cable in a location removed from the watercraft, allowing use of automated cable termination machines for efficiency and consistency of terminations. The single-terminated cable may then be brought to the watercraft and installed by pulling or routing the unterminated end through ductwork and pipes, watertight bulkhead throughways, and cable trays and ladders as necessary, prior to termination. Accordingly, more difficult and expensive on-site labor is reduced, and reliability is greatly increased. Furthermore, many cable tests that require termination but cannot be executed post-installation can be performed prior to installation, to ensure that at least the first termination, performed off-site, is error-free, reducing later troubleshooting and further increasing installation efficiency.

15 Claims, 8 Drawing Sheets

(56) References Cited

U.S. PATENT DOCUMENTS

| | | |
|---|---|---|
| 3,456,324 A | 7/1969 | Hahn |
| 3,686,752 A | 8/1972 | Hammond |
| 3,703,954 A | 11/1972 | Gudmestad |
| 3,768,143 A | 10/1973 | Holmes, Jr. |
| 3,875,662 A | 4/1975 | Folk |
| 3,909,900 A | 10/1975 | Gudmestad |
| 3,973,600 A | 8/1976 | Choromokos |
| 4,175,316 A | 11/1979 | Gudmestad |
| 4,214,848 A | 7/1980 | Verwey et al. |
| 4,276,113 A | 6/1981 | Carlsen et al. |
| 4,336,047 A | 6/1982 | Pavlopoulos et al. |
| 4,410,561 A | 10/1983 | Hart, Jr. |
| 4,440,053 A | 4/1984 | Suzuki et al. |
| 4,489,830 A | 12/1984 | Charlebois et al. |
| 4,525,312 A | 6/1985 | Jones |
| 4,531,702 A | 7/1985 | Plummer |
| 4,597,338 A | 7/1986 | Kreeger |
| 4,627,942 A | 12/1986 | Gagen et al. |
| 4,662,307 A | 5/1987 | Amos et al. |
| 4,671,629 A | 6/1987 | Doyle |
| 4,749,252 A | 6/1988 | Yanagi et al. |
| 4,762,580 A | 8/1988 | Robertson |
| 4,763,272 A | 8/1988 | McLandrich |
| 4,840,449 A | 6/1989 | Ghandeharizadeh |
| 4,846,343 A | 7/1989 | Rupert |
| 4,865,411 A | 9/1989 | Darsey et al. |
| 4,916,811 A | 4/1990 | Uehara et al. |
| 4,976,596 A | 12/1990 | Darsey et al. |
| 4,978,413 A | 12/1990 | Schotter |
| 5,013,121 A | 5/1991 | Anton et al. |
| 5,022,735 A | 6/1991 | Dahlgren |
| 5,066,149 A | 11/1991 | Wheeler et al. |
| 5,074,635 A | 12/1991 | Justice et al. |
| 5,093,048 A | 3/1992 | Kagan |
| 5,117,528 A | 6/1992 | Kanayama et al. |
| 5,149,350 A | 9/1992 | Itoh et al. |
| 5,157,751 A | 10/1992 | Maas et al. |
| 5,159,655 A | 10/1992 | Ziebol et al. |
| 5,168,617 A | 12/1992 | Tsuchida et al. |
| 5,179,608 A | 1/1993 | Ziebol et al. |
| 5,208,977 A | 5/1993 | Ricard |
| 5,214,732 A | 5/1993 | Beard et al. |
| 5,239,604 A | 8/1993 | Ziebol et al. |
| 5,240,489 A | 8/1993 | Robson |
| 5,261,019 A | 11/1993 | Beard et al. |
| 5,277,730 A | 1/1994 | Darsey et al. |
| 5,293,582 A | 3/1994 | Beard et al. |
| 5,316,243 A | 5/1994 | Henneberger |
| 5,351,334 A | 9/1994 | Chun et al. |
| 5,358,583 A | 10/1994 | Hatchadoorian et al. |
| 5,367,591 A | 11/1994 | Seike et al. |
| 5,381,497 A | 1/1995 | Toland et al. |
| 5,386,488 A | 1/1995 | Oikawa |
| 5,386,490 A | 1/1995 | Pan et al. |
| 5,395,101 A | 3/1995 | Takimoto et al. |
| 5,403,227 A | 4/1995 | Franklin et al. |
| 5,442,725 A | 8/1995 | Peng |
| 5,447,464 A | 9/1995 | Franklin et al. |
| 5,475,784 A | 12/1995 | Bookbinder et al. |
| 5,487,125 A | 1/1996 | Kammlott et al. |
| 5,497,444 A | 3/1996 | Wheeler |
| 5,515,472 A | 5/1996 | Mullaney et al. |
| 5,519,804 A | 5/1996 | Burek et al. |
| 5,526,157 A | 6/1996 | Kawano |
| 5,526,833 A | 6/1996 | Crespel et al. |
| 5,533,160 A | 7/1996 | Watanabe et al. |
| 5,561,728 A | 10/1996 | Kobayashi et al. |
| 5,587,116 A | 12/1996 | Johnson et al. |
| 5,590,234 A | 12/1996 | Pulido |
| 5,607,282 A | 3/1997 | Brannen et al. |
| 5,611,015 A | 3/1997 | Tokumaru et al. |
| 5,715,348 A | 2/1998 | Falkenberg et al. |
| 5,724,469 A | 3/1998 | Orlando |
| 5,757,996 A | 5/1998 | Vine |
| 5,770,001 A | 6/1998 | Nagayama et al. |
| 5,815,619 A | 9/1998 | Bloom |
| 5,835,660 A | 11/1998 | Jung et al. |
| 5,871,559 A | 2/1999 | Bloom |
| 5,896,486 A | 4/1999 | Burek et al. |
| 5,926,594 A | 7/1999 | Song et al. |
| 5,966,492 A | 10/1999 | Bechamps et al. |
| 5,970,749 A | 10/1999 | Bloom |
| 5,987,207 A | 11/1999 | Hoke |
| 6,003,341 A | 12/1999 | Bloom |
| 6,004,123 A | 12/1999 | Buckley et al. |
| 6,085,763 A | 7/2000 | Esmaeili et al. |
| 6,088,503 A | 7/2000 | Chandler et al. |
| 6,122,936 A | 9/2000 | Csipkes et al. |
| 6,139,196 A | 10/2000 | Feth et al. |
| 6,153,258 A | 11/2000 | Goldman et al. |
| 6,190,057 B1 | 2/2001 | Osaka et al. |
| 6,192,180 B1 | 2/2001 | Kim et al. |
| 6,195,496 B1 | 2/2001 | Daoud |
| 6,206,583 B1 | 3/2001 | Hishikawa et al. |
| 6,209,163 B1 | 4/2001 | Clairadin et al. |
| 6,215,938 B1 | 4/2001 | Reitmeier et al. |
| 6,230,403 B1 | 5/2001 | Skoolicas |
| 6,237,370 B1 | 5/2001 | Bloom |
| 6,240,236 B1 | 5/2001 | Daoud |
| 6,249,636 B1 | 6/2001 | Daoud |
| 6,259,855 B1 | 7/2001 | Lundin |
| 6,264,374 B1 | 7/2001 | Selfridge |
| 6,272,276 B1 | 8/2001 | Potteiger et al. |
| 6,388,891 B1 | 5/2002 | Falkenberg et al. |
| 6,530,246 B1 | 3/2003 | Hausmann |
| 6,560,666 B1 | 5/2003 | Harriman et al. |
| 6,560,811 B1 | 5/2003 | Krause et al. |
| 6,580,866 B2 | 6/2003 | Daoud et al. |
| 6,608,958 B2 | 8/2003 | Anderson |
| 6,625,374 B2 | 9/2003 | Holman et al. |
| 6,669,128 B2 | 12/2003 | Appleby et al. |
| 6,676,763 B2 | 1/2004 | Johnson, III et al. |
| 6,758,605 B1 | 7/2004 | Villemaire et al. |
| 6,810,192 B2 | 10/2004 | Aude et al. |
| 6,895,654 B2 | 5/2005 | Strandberg et al. |
| 6,964,288 B2 | 11/2005 | Christopher et al. |
| 6,988,854 B2 | 1/2006 | Porter |
| 7,163,343 B2 | 1/2007 | Matta et al. |
| 7,266,273 B2 | 9/2007 | Bonicel et al. |
| 7,457,499 B2 | 11/2008 | Russert et al. |
| 7,809,230 B2 | 10/2010 | Christopher et al. |
| 7,978,950 B2 | 7/2011 | Christopher et al. |
| 8,254,738 B2 * | 8/2012 | Sicari et al. .................. 385/100 |
| 2002/0108636 A1 | 8/2002 | Childers et al. |
| 2003/0007774 A1 | 1/2003 | Christopher et al. |
| 2003/0169992 A1 | 9/2003 | Fujiwara et al. |
| 2004/0007250 A1 | 1/2004 | Forrest |
| 2004/0086232 A1 | 5/2004 | Fujiwara et al. |
| 2004/0251405 A1 * | 12/2004 | Yankielun ............... 250/227.14 |
| 2006/0191091 A1 | 8/2006 | Kida |
| 2007/0023067 A1 | 2/2007 | Kida et al. |
| 2007/0025676 A1 * | 2/2007 | Russell ..................... 385/134 |
| 2007/0203623 A1 | 8/2007 | Saunders |
| 2012/0051701 A1 | 3/2012 | Sicari et al. |

FOREIGN PATENT DOCUMENTS

| | | |
|---|---|---|
| EP | 0215668 | 3/1987 |
| EP | 999460 A2 | 5/2000 |
| JP | 07155706 A | 6/1995 |
| JP | 09197182 | 7/1997 |
| JP | 2000123661 A | 4/2000 |
| JP | 2001137795 A | 5/2001 |
| JP | 2001149874 A | 6/2001 |
| WO | WO-9711917 | 4/1997 |

(56) References Cited

FOREIGN PATENT DOCUMENTS

OTHER PUBLICATIONS

Ericsson Product Literature (1998).
Jacobs, J. "Suggested Guidelines for the Handling of Optical Fiber White Paper" Corning Incorporated (2001).
LuxCis Fiber Optic Assembly Instructions, Radiall, Dec. 20, 2004.
Power Point Presentation entitled "Next Generation Manufacturing of Mil/Aero Fiber Optic Interconnect Cables" presented at the Defense Manufacturing Conference Nov. (2004).
U.S. Appl. No. 09/969,544, filed Oct. 2, 2001, Abandoned.
U.S. Appl. No. 09/969,555, filed Oct. 2, 2001, Abandoned.
U.S. Appl. No. 09/969,894, filed Oct. 2, 2001, Abandoned.

* cited by examiner

METHODS AND SYSTEMS FOR EFFICIENT INSTALLATION OF CABLES IN WATERCRAFT

CROSS-REFERENCE TO RELATED APPLICATIONS

This application claims the benefit of U.S. patent application Ser. No. 13/560,543, filed on Jul. 27, 2012, which claims the benefit of U.S. patent application Ser. No. 12/869,916, filed Aug. 27, 2010, now U.S. Pat. No. 8,254,738. Each of the aforementioned applications and issued patents is hereby incorporated by reference in its entirety.

FIELD OF THE INVENTION

The present application generally relates to cable installation. In particular, the present application relates to systems and methods for efficient installation of optical and electrical cable in watercraft.

BACKGROUND OF THE INVENTION

Vehicles, including automobiles, trucks, watercraft, and aircraft, have included electrical cabling for over a century. Electrical cabling has been in use on watercraft in particular since the early 1880s, when electric lights were first installed on the H.M.S. Inflexible. However, installation of these cables can be tedious and inefficient, due to the requirements of space, weight, and the amount of cabling required. For example, a modern airplane or ship may have more than a hundred miles of electrical wiring.

In the past, wiring has been installed in these vehicles using similar methods to those used in building construction: during the initial framing, while walls are still open, wires may be manually passed from one section to another and cut to length. After the walls are finished, the wires may be terminated in outlets and switches or other connectors. Accordingly, electricians are required to perform part of their work at one time, and part at another time, complicating project management and increasing expense. Unlike building construction, however, many land vehicles and aircraft are manufactured in mass assembly lines. The requirement of pausing assembly at a first stage to install electrical wiring and then returning at another stage to terminate wires reduces the efficiency gained in automation.

To reduce this inefficiency, manufacturers have taken advantage of the consistency of manufactured parts generated by assembly lines. Because the wires in every car of a specific model will be the same length and follow the same routing path, rather than pulling wires individually in the finished vehicle and cutting them to length, electricians can use worktables customized for the installation. For example, shown in FIG. 1A is a diagram of an embodiment of a wire harness 100 assembled on a wireboard 102. The wireboard may be plywood or other materials, and may include pins or nails 104 placed along a path. Wires 106 may be routed along the paths defined by these pins and cut to lengths specified on the wireboard 102. Connectors 108 may be installed on the wireboard, and the wires may be tied or bundled together to form the harness. Referring now to FIG. 1B, the preassembled wire harness 100 may be removed from the wireboard and installed into a vehicle, confident in the knowledge that each wire will be the proper length for the various bends and turns it needs to take to reach instrument panels, switches, or other components.

The same technique may be used in the construction of a wire harness for an aircraft. Referring now to FIG. 2A, shown is a diagram of an embodiment of an airplane wire harness 200 assembled on a wireboard 202. The wireboard 202 may be a many pieces of plywood or other materials placed together to form a full-size outline of the aircraft. In some instances, due to the size involved, wireboard 202 may not physically exist, but rather comprise a large open space, such as the floor of an airplane hangar or manufacturing plant and be painted or marked with an outline of the aircraft 203 or the locations of various components within the finished aircraft. In other embodiments, as shown in FIG. 1A, wires may be looped back on themselves to achieve the necessary length without requiring a full-size mockup. Similar to the creation of a wire harness shown in FIG. 1A, in FIG. 1B, wires 206 may be routed along pins 204 to final locations, cut to length, and terminated. The wires may then be tied or bundled to form a finished wire harness 200. Referring now to FIG. 2B, the preassembled wire harness 200 may be installed into pre-manufactured sections of the aircraft 210. Because the wire harness may be assembled separately from the vehicle, electricians can prepare multiple harnesses concurrently, increasing efficiency.

As shown in FIG. 2B, aircraft are manufactured in sections, which may then be joined together, simplifying installation. A wire harness stretching the full length of the aircraft can be run through openings between each section, and as the sections are brought together, may be attached to mounting points or connected to terminations such as engines, control surfaces, instrument panels, and other features. Vehicles are similarly constructed in sections that are joined together, such as doors bolted on to the main body. Accordingly, a wire harness may be fed through openings in the body and doors prior to attachment, and the openings may be of sufficient size to accommodate the large connectors required for multi-conductor cables.

Installation of cables into watercraft poses significant additional problems, however. Shown in FIG. 3 is a cutaway diagram of an embodiment of a watercraft 300. Unlike manufacture of aircraft and automobiles, watercraft are frequently constructed by laying watertight bulkheads 304 along a keel and affixing the hull 302 at one time. Because of the watertight sections, pre-terminated wire harnesses may not be able to be pulled through bulkhead openings.

Furthermore, while a large assembly line may output thousands of cars per day with identical wire run lengths, ships are frequently custom designed or customized from a base design. Accordingly, even two ships built in succession by the same manufacturer may have very different wiring requirements. In the modern industrial shipbuilding technique known as block construction, sections of a large watercraft are built separately before being bolted and welded together. Although similar to the sectioned construction of aircraft shown in FIG. 2B, the customization of watercraft means that prebuilt wire harnesses cannot be used even in these manufacturing techniques, because of imprecise calculations of wire run lengths. One answer would be to simply make every wire longer than necessary and leave the excess in loops at one end. However, this adds significant weight and takes up large amounts of room, particularly with the hundreds of miles of wiring in modern watercraft. Furthermore, because connectors used in watercraft are frequently large, particularly for military-grade or MIL-SPEC installations required on naval vessels or when a cable includes multiple conductors to be terminated in a multi-pin connector, the connectors may be too large to be preinstalled and pulled through watertight cable throughways, ductwork, and other pass-throughs in watertight bulkheads. Accordingly, cables are still installed in watercraft today in the same inefficient pull-cut-terminate method used over one hundred years ago.

BRIEF SUMMARY OF THE INVENTION

The present application is directed towards systems and methods for efficient installation of optical and electrical cable in watercraft. A manufacturer may terminate one end of a cable in a location removed from the watercraft, allowing use of automated cable termination machines for efficiency and consistency of terminations. The single-terminated cable may then be brought to the watercraft and installed by pulling or routing the unterminated end through ductwork and pipes, watertight bulkhead throughways, and cable trays and ladders as necessary, prior to termination. Accordingly, more difficult and expensive on-site labor is reduced, and reliability is greatly increased. Furthermore, many cable tests that require termination but cannot be executed post-installation can be performed prior to installation, to ensure that at least the first termination, performed off-site, is error-free, reducing later troubleshooting and further increasing installation efficiency.

In one aspect, the present invention features a method for efficient installation of cable in a watercraft. The method includes terminating, at a location different from a watercraft, a first end of a cable to be installed. The method also includes installing the cable on the watercraft. The method further includes terminating a second end of the installed cable.

In some embodiments, the method includes the location different from the watercraft comprising a cable manufactory. In many embodiments, the method includes the cable comprising a multi-conductor cable. In some embodiments, the method includes the cable comprising an optical fiber cable. In other embodiments, the method includes the cable comprising an electrical cable.

In one embodiment, the method includes installing a connector on the cable. In a further embodiment, the method includes the connector meeting a military standard (MIL-SPEC). In another further embodiment, the method includes testing performance of the installed connector at the location different from the watercraft. In a still further embodiment in which the cable comprises a multi-conductor cable, the method includes performing a high potential (referred to variously as a "hi-potential", "hi-voltage", "hi-pot" or "hipot") test between a plurality of conductors of the multi-conductor cable. In another still further embodiment, the method includes terminating the second end of the installed cable at the location different from the watercraft, testing performance of the installed connector with the terminated second end, and removing the terminated second end of the installed cable prior to installing the cable on the watercraft.

In some embodiments, the method includes routing the cable through a multi-cable throughway in a watertight bulkhead. In other embodiments, the method includes routing the cable through a plurality of compartments.

In one embodiment, the method includes determining a first length of a first cable run on the watercraft and a second length of a second cable run on the watercraft, cutting a cable to third length of at least the first length plus the second length, terminating the first end of the cable, terminating the opposite end of the cable, and cutting the cable at a position at least the first length from the first terminated end. In a further embodiment, the method includes testing the performance of the cable prior to cutting the cable at the position at least the first length from the first terminated end. In another further embodiment, the method includes cutting the cable to create a second cable of length of at least the first length with a single terminated end and a third cable of length of at least the second length with a single terminated end, installing the second cable and the third cable on the watercraft, and terminating an unterminated end of the second cable and terminating an unterminated end of the third cable.

In another aspect, the present invention features a method for efficient manufacture of cable for a watercraft. The method includes determining a first length of a first cable run on the watercraft and a second length of a second cable run on a watercraft. The method also includes cutting a cable to a third length of at least the first length plus the second length. The method further includes terminating the first end of the cable. The method also includes terminating the second end of the cable. The method also includes cutting the cable at a position at least the first length from the first terminated end.

In some embodiments, the method includes testing the performance of the terminated first end and terminated second end of the cable prior to cutting the first cable. In one embodiment, the cable comprises an optical fiber cable. In another embodiment, the cable comprises an electrical cable. In another aspect, the present invention features a single-terminated cable made by the method for efficient manufacture of cable for a watercraft.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
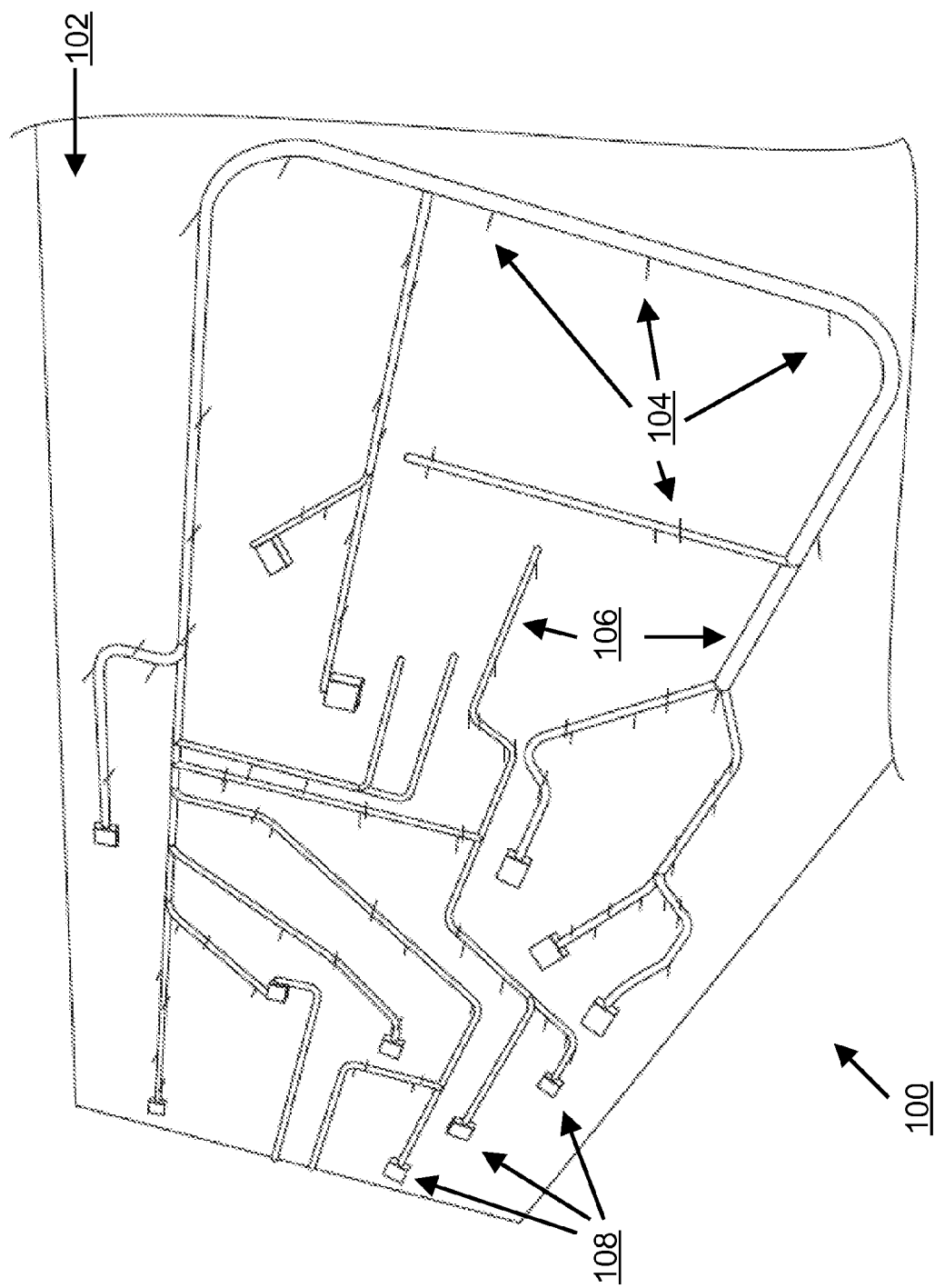
FIG. 1A is a diagram of an embodiment of a wire harness assembled on a wireboard.
Figure 1B:
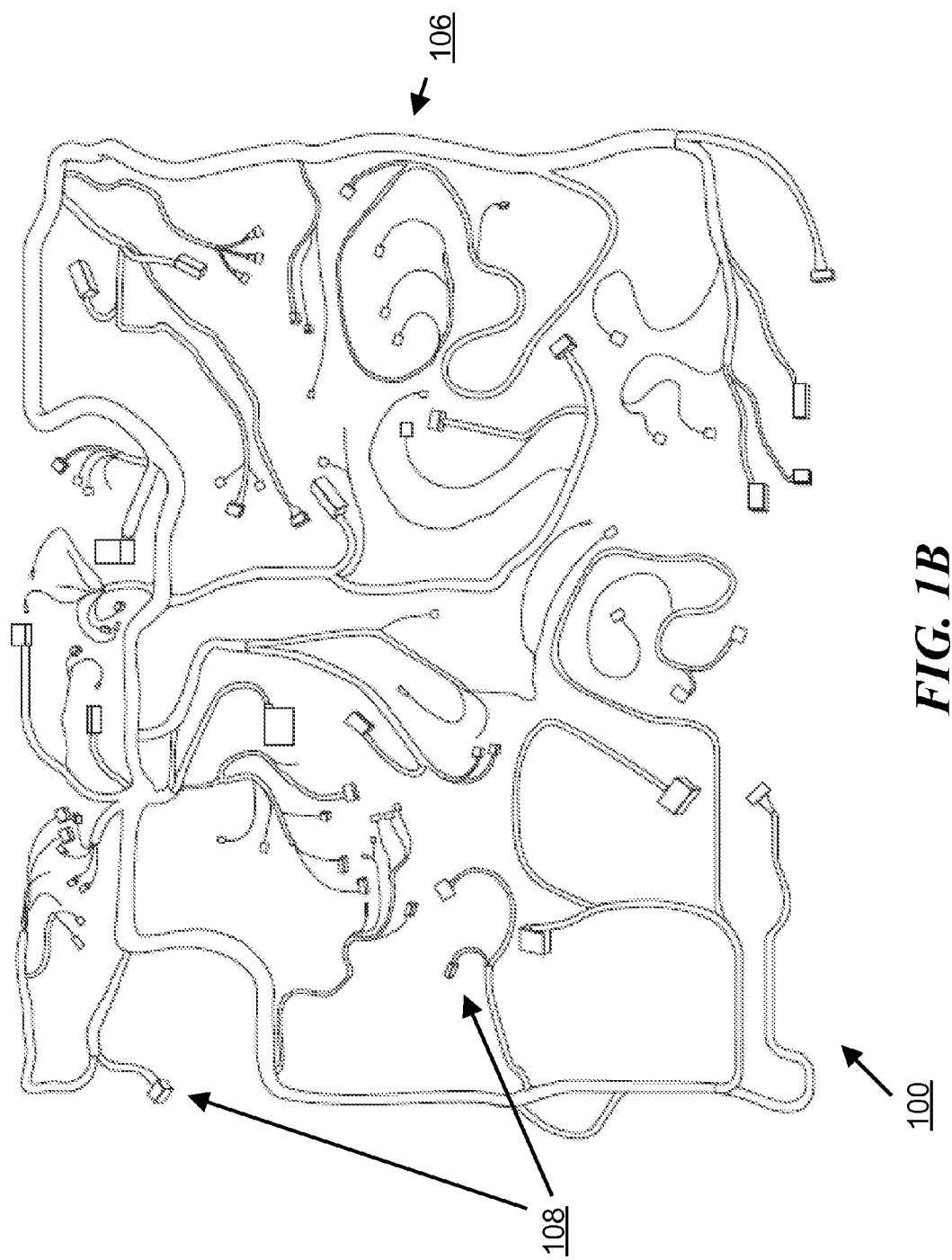
FIG. 1B is a diagram of an embodiment of an assembled wire harness.
Figure 2A:
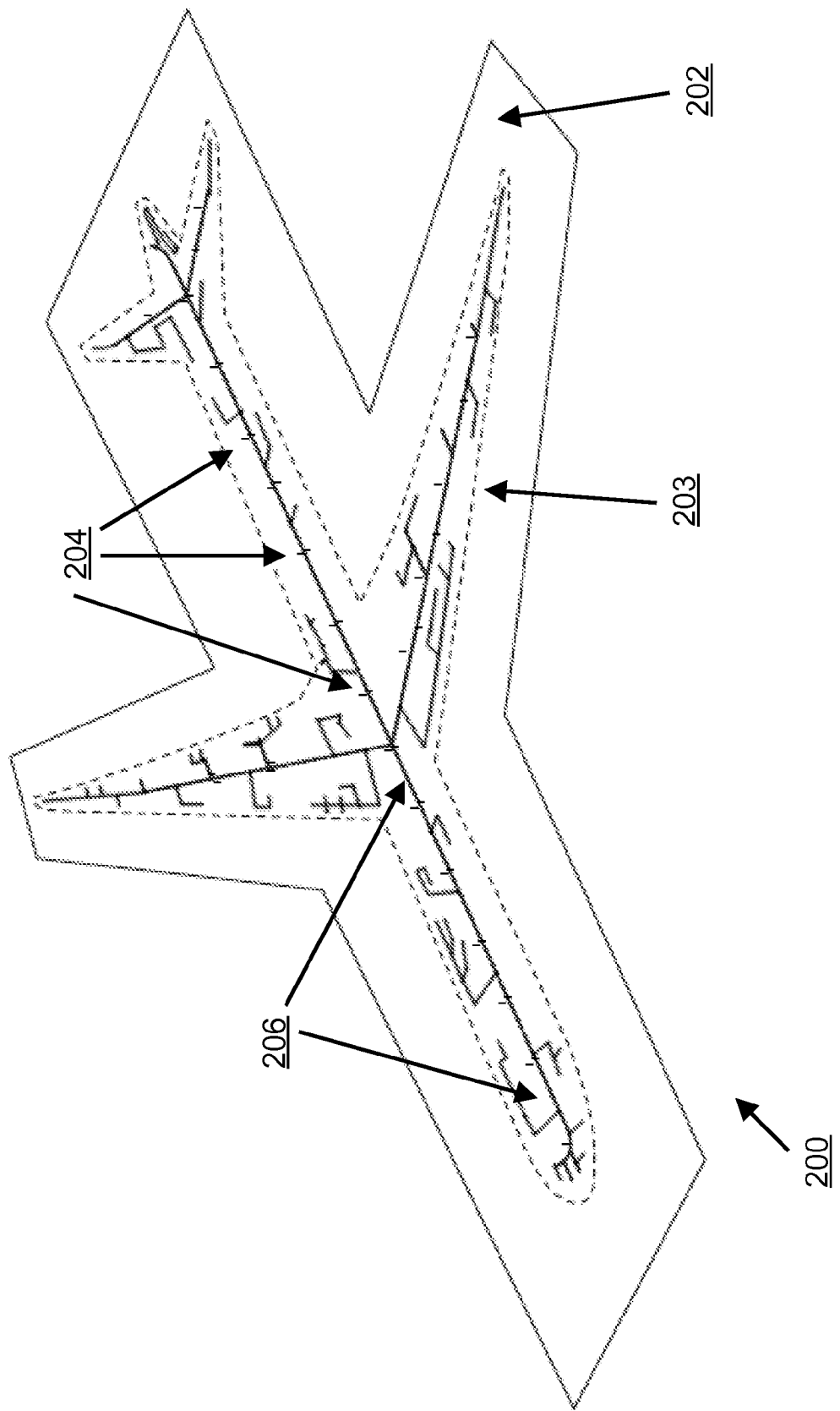
FIG. 2A is a diagram of an embodiment of an airplane wire harness assembled on a wireboard.
Figure 2B:
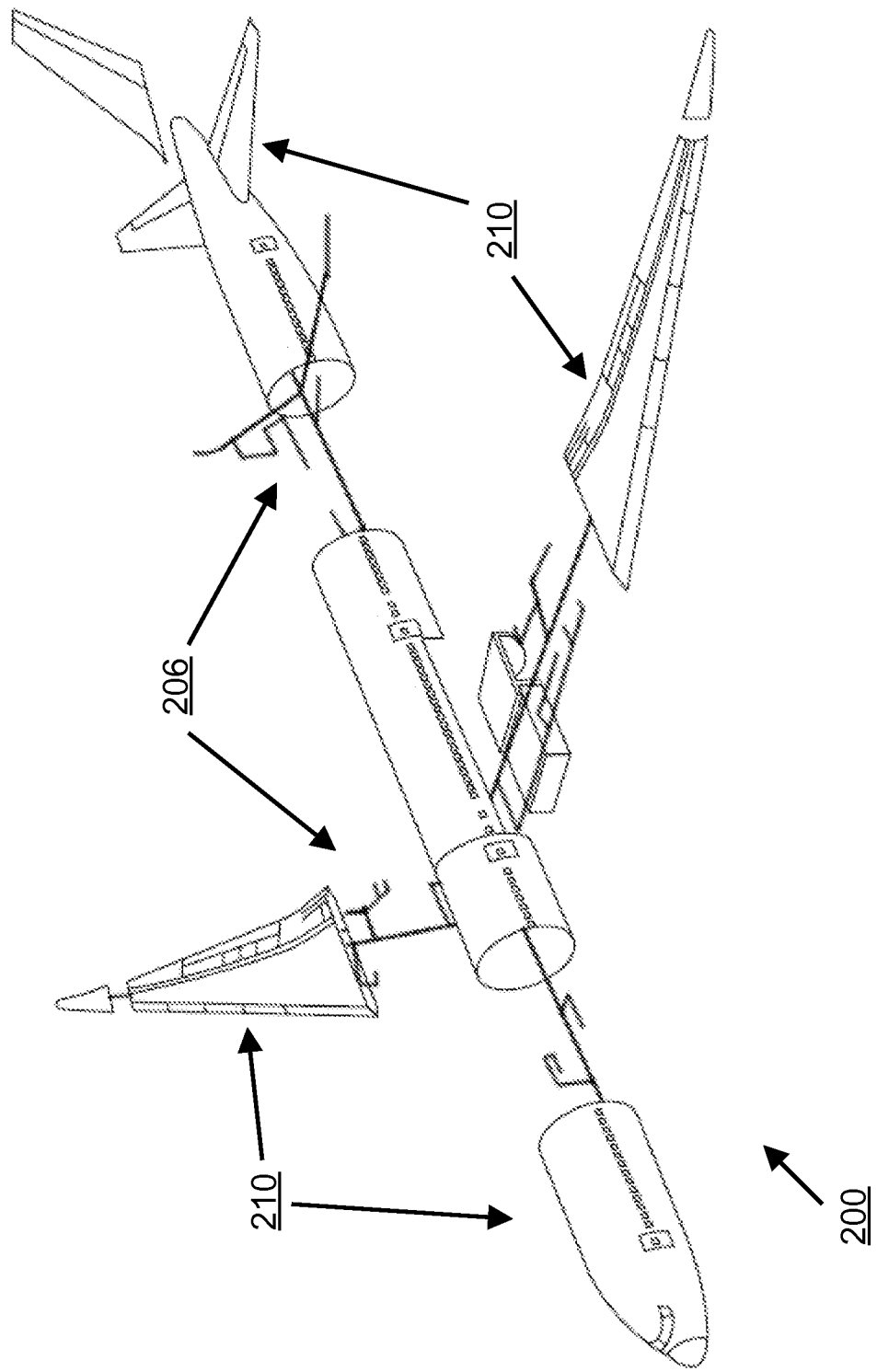
FIG. 2B is an exploded view of an embodiment of installation of an airplane wire harness into an airplane.
Figure 3:
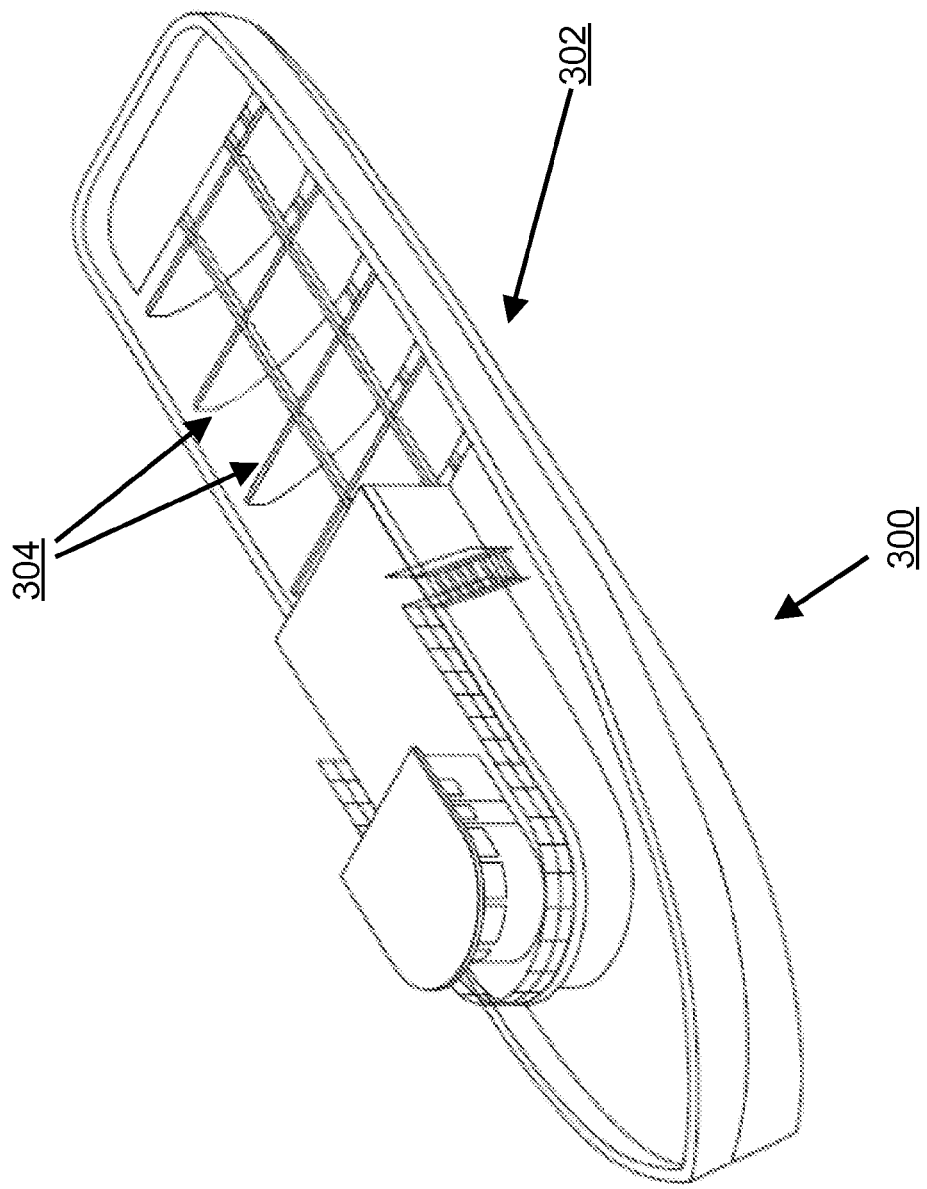
FIG. 3 is a cutaway diagram of an embodiment of a watercraft.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes methods for efficient cable manufacture and installation into watercraft;

Section B describes systems and methods for termination and testing of electrical cables using embodiments of the efficient manufacture and installation methods described herein; and Section C describes systems and methods for termination and testing of optical fiber cables using embodiments of the efficient manufacture and installation methods described herein.

A. Efficient Cable Manufacture and Installation into Watercraft

As discussed above, in many instances of installing cables on watercraft, due to customization, exact lengths of cable runs may not be known in advance. Furthermore, even when exact runs may be calculated or measured from plans, in practice, cables may wrap around other cables when pulled or take larger radius paths through bends, reducing the effective length that can be pulled. Accordingly, if an installer cuts a cable to a precisely calculated length for a run, once installed, the cable may be short by a foot or more. Due to the exacting standards of military-standard compliant (MIL-SPEC) installations, in some instances, cables may not be spliced to add additional length. Instead, the cable must be removed and replaced with a longer cable, increasing expense and installation time.

Additionally, due to space considerations, it may be difficult to terminate cables within the watercraft. Some cables may end in cramped spaces, behind unmovable equipment racks, or in locations of limited accessibility such as in radio masts or behind engines. Because many connectors may be large, particularly rugged MIL-SPEC connectors or connectors for multi-conductor cables, in-place termination may be tough, time-consuming and error-prone.

Accordingly, in many embodiments, it may be preferable to terminate one end of a cable in a location removed from the watercraft. For example, a manufacturer may terminate one end of a cable at a factory, allowing use of automated cable termination machines for efficiency and consistency of terminations. The single-terminated cable may then be brought to the watercraft and installed by pulling or routing the unterminated end through ductwork and pipes, watertight bulkhead throughways, and cable trays and ladders as necessary. The unterminated end may then be terminated. Due to the difficulty of in-place termination, the efficiency gained by terminating one end of the cable in an easier off-site location is frequently greater than 50%, because fewer terminations will need to be re-done due to shorts or weak connections. Additionally, as discussed in more detail below, many cable tests may be performed off-site that could not be performed after installation. Performing these tests may ensure that the first termination, performed off-site, is error-free, reducing later troubleshooting and further increasing installation efficiency.

In some embodiments, additional installation efficiency can be gained by strategically selecting which end of a cable to terminate off-site. For example, in many embodiments, a cable may be run between two locations, one of which may a difficult or cramped place to access for termination purposes, such as behind immovable equipment, in small between-deck areas, on radio masts, or other areas that may be difficult for an installer to reach or comfortably work in during termination. Accordingly, by selecting these locations and pre-terminating the ends of cables to be installed in these locations in a more comfortable work location off-site, an installer can work more efficiently.

Similarly, in many embodiments, many cables may be run from a first location, such as a control room, to locations all over the watercraft. Termination of cables frequently requires equipment to be set up, including soldering irons, work tables or clamps, bright lighting, magnifiers, or other tools. It may be preferable in these embodiments to reduce the need for installers to move these tools around the watercraft. By strategically selecting and pre-terminating the ends of these cables that will be installed in the locations around the watercraft, the installer will be able to remain in the first location, such as the control room, and terminate all of the unterminated ends of these cables without having to transport his or her tools around the watercraft.

Figure 4:
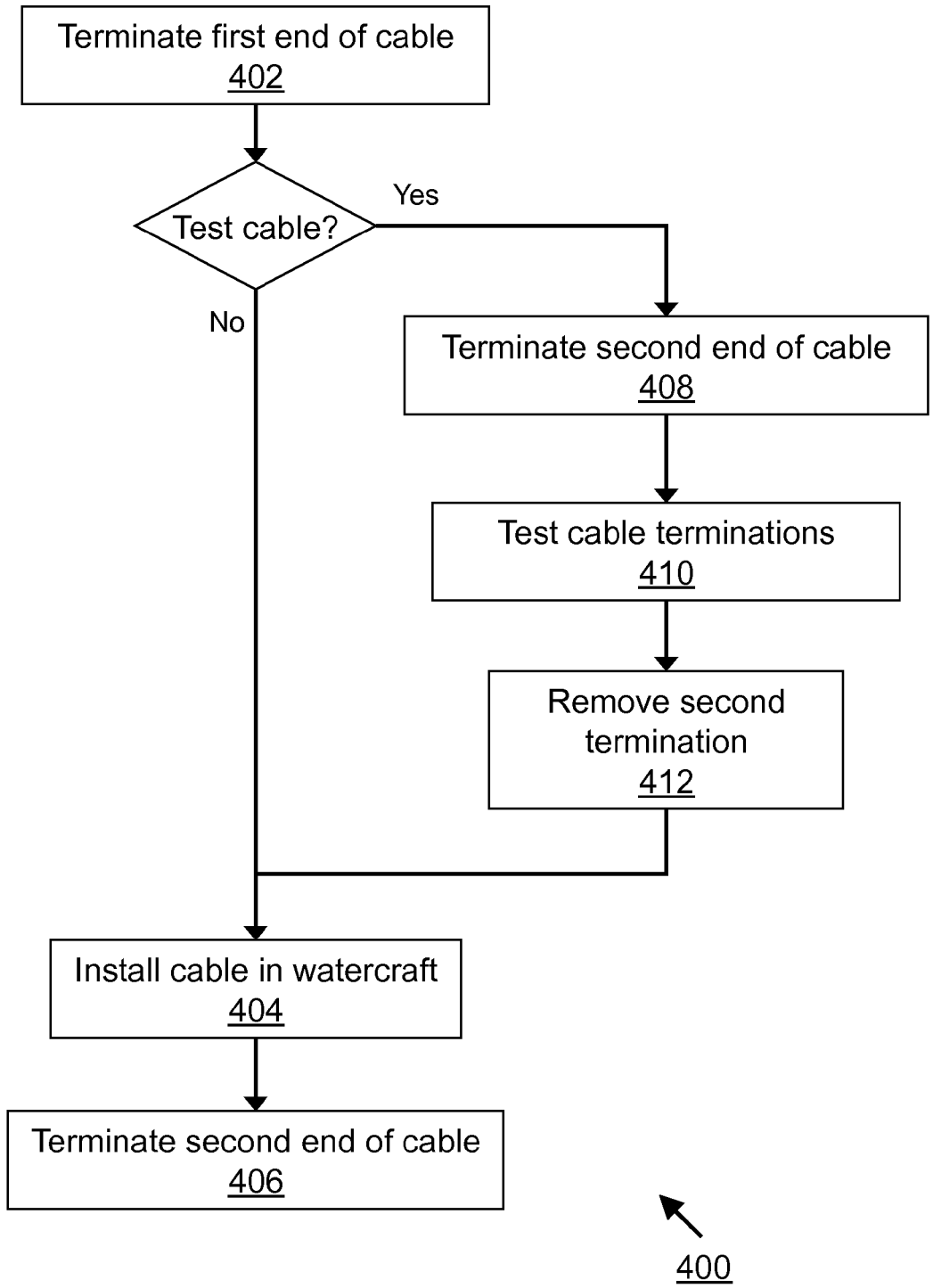
FIG. 4 is a flow chart of an embodiment of a method of efficient cable manufacturing, testing, and installation into a watercraft.

Referring now to FIG. 4, a flow chart of an embodiment of a method 400 of efficient cable manufacturing, testing, and installation into a watercraft is shown. In brief overview, at step 402, an installer or manufacturer may terminate a first end of a cable. At step 404, the cable may be installed in the watercraft. At step 406, the installer may terminate the second end of the cable. In some embodiments utilizing an off-site testing procedure, prior to step 404, the second end of the cable may be terminated at step 408. The cable terminations may be tested at step 410. At step 412, the second termination may be removed. The cable may then be installed at step 404 and terminated at step 406 as above.

Still referring to FIG. 4 and in more detail, at step 402, an installer or manufacturer may terminate a first end of a cable at a location different from a watercraft intended for installation of the cable. In some embodiments, the location different from the watercraft may comprise a cable manufactory or other manufacturing location. In other embodiments, the location different from the watercraft may comprise a temporary or permanent termination installation area, such as a warehouse or other location. In some embodiments, the cable may be a single-conductor cable, such as a grounding cable, while in other embodiments, the cable may be a multi-conductor cable. Multi-conductor cables may include, without limitation, coaxial cables, untwisted or twisted pair cables, multi-pair cables, serial or parallel data cables including USB cables, Ethernet cables such as Cat-3, Cat-5, Cat-6 or any other standard, balanced or unbalanced audio cables, composite or component video cables, digital video cables including HDMI and DVI video cables, single or multi-mode optical fiber cables, or any combination of electrical and/or optical fiber cables.

In some embodiments, terminating the first end of the cable may comprise installing a connector on the cable, discussed in more detail below in parts B and C, with reference to electrical and optical fiber cables, respectively. In many embodiments, the connector may meet a military standard, such as a MIL-SPEC connector. Once the first end of the cable is terminated, in some embodiments, the cable may be placed onto a spool or reel for ease of storage, transportation, and unwinding during installation. In many embodiments, the cable may be cut to a length greater than the distance the cable is to run on the watercraft. For example, if a cable is to run 300' from one compartment to another, the cable may be cut to a length greater than 300', such as 330'. This provides a 10% margin of error in measurement or for the cable to wrap around other cables during routing. Prior to terminating the second end of the cable, the cable may be cut to a final installation length.

At step 404, the cable may be installed in the watercraft. In some embodiments, the cable may be installed within a single compartment, while in other embodiments, the cable may be installed through a plurality of compartments. For example, in one such embodiment, the cable may be installed from an engine room to a wheelhouse or control center. In many embodiments, installing the cable may comprise routing the cable through a single-cable or multi-cable throughway (MCT), or a watertight cable pass-through in a watertight bulkhead. The cable throughway may comprise a pipe, tube, hole, or other pass-through and may include a sealing material, and installing the cable may comprise installing the cable through or with the sealing material. In other embodiments, installing the cable may comprise routing or pulling the cable through ductwork or pipes or other pass-throughs between decks, which may be variously watertight or non-watertight. Installing the cable may also comprise routing the cable via cable trays or ladder trays or through retaining rings. In some embodiments, installing the cable may also comprise tying or securing the cable in bundles or to cable retainers.

In some embodiments, the cable may be installed starting from a first location where the first terminated end of the cable will be connected. For example, in one such embodiment with a single-terminated cable to be run from an engine room to a wheelhouse with the terminated end to be connected to equipment in the engine room, the unterminated end of the cable may be pulled or routed from the engine room to the wheelhouse. In many embodiments, particularly involving routing cable through pipes or ducts, a wire snake may be first pushed through the pipe or duct. The cable may be tied or otherwise attached to the snake, and the snake may be pulled back through the pipe or duct to pull the cable. In other embodiments, the snake may first pull a pull string through the pipe, and the cable may then be attached to the pull string and pulled through the pipe. In some embodiments, because excessive strain may damage conductors in a cable, strain gages may be attached to the cable during pulling and monitored for overall strain.

Once the second end of the cable has been pulled to its final location, at step 406, the second end of the cable may be terminated. As discussed above, terminating the cable may comprise installing a connector onto the cable, discussed in more detail below.

As discussed above, by terminating the cable at a location removed from the watercraft, in many embodiments testing may be performed on the cable that could not be performed or as easily performed after installation. For example, and discussed in more detail below, in a typical installation, an installed and terminated cable may be tested for continuity along each conductor: a voltage may be applied to pin 1 on one connector and measured on pin 1 of the other connector to check for breaks. The voltage may then be applied to pin 2 and measured on pin 2; applied to pin 3 and measured on pin 3; and so on until continuity of all conductors has been measured. In some embodiments, rather than a steady voltage, a signal or tone may be applied and detected on the other connector. While these tests ensure continuity, they don't detect shorts or breaks in insulation. For example, due to a break in insulation within the cable or a short in one of the terminations, a voltage applied to pin 1 may also show up on pin 3. Normal continuity tests would fail to detect this condition, and testing between pins is not ordinarily performed after installation on the watercraft due to the time and expense involved: a multi-conductor cable with fifty conductors could require $50^{\wedge}50$ or more than $10^{\wedge}84$ continuity tests, and a large watercraft may have hundreds or thousands of such cables installed.

Furthermore, continuity tests performed after installation are usually at low-voltage, for safety reasons: at high voltage, a short circuit could start a fire inside a between-deck duct, resulting in significant damage. However, such low-voltage tests may not detect worn insulation that may fail to insulate at higher voltages, short circuits that have high resistance due to oxidation, or broken insulation between two conductors that are nonetheless separated by a slight gap.

Automated, high voltage or potential (hi-pot) tests may be efficiently performed in a location removed from the watercraft. In some embodiments, these tests may require terminating the second end of the cable at step 408. In many embodiments, terminating the second end of the cable may comprise installing a connector onto the cable, as at step 402. At step 410, the cable and terminations may be tested. In some embodiments, testing may be performed manually, while in other embodiments, automated testing may be performed. Testing methods are discussed in more detail below.

At step 412, the second termination may be removed. In some embodiments, removing the second termination may comprise cutting the cable while in other embodiments, removing the second termination may comprise removing or desoldering components of the terminated connector. After removal of the termination, method 400 may proceed with steps 404 and 406.

Figure 5A:
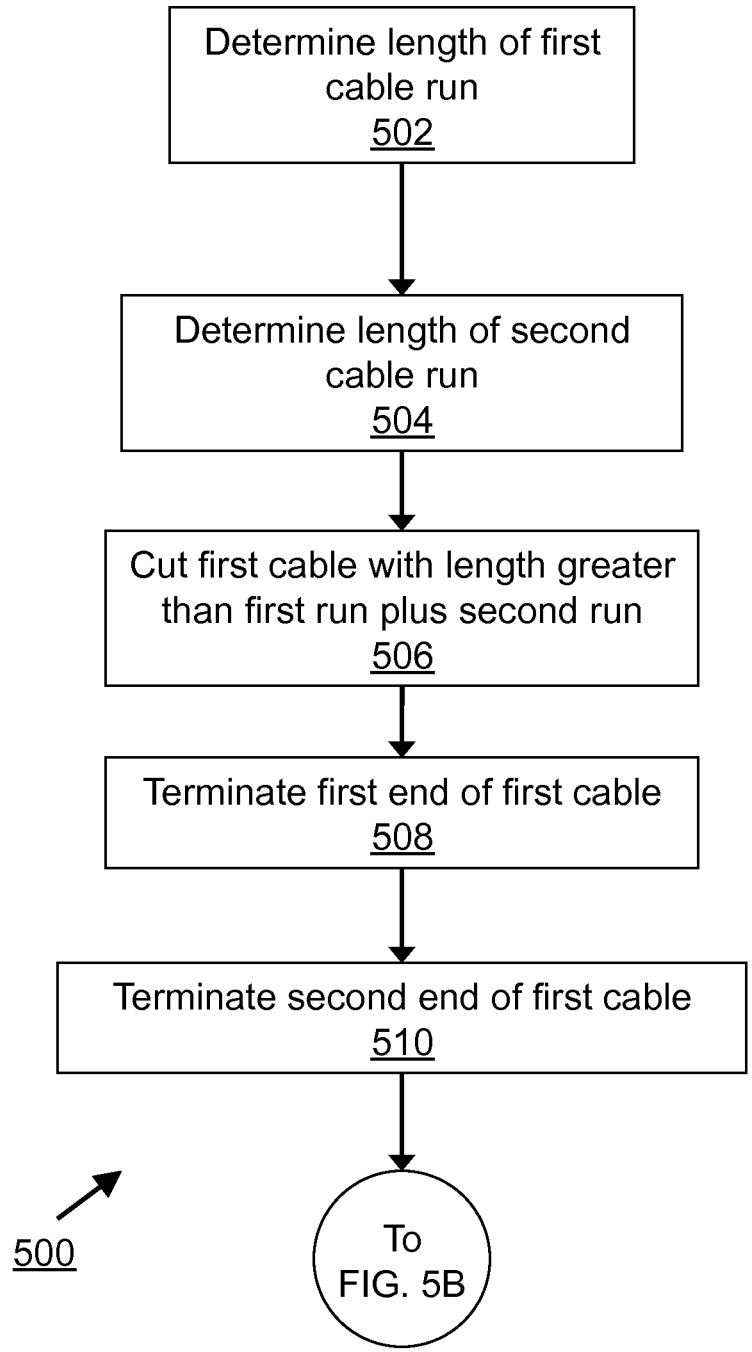
FIGS. 5A and 5B are a flow chart of another embodiment of a method of efficient cable manufacturing, testing, and installation into a watercraft.
Figure 5B:
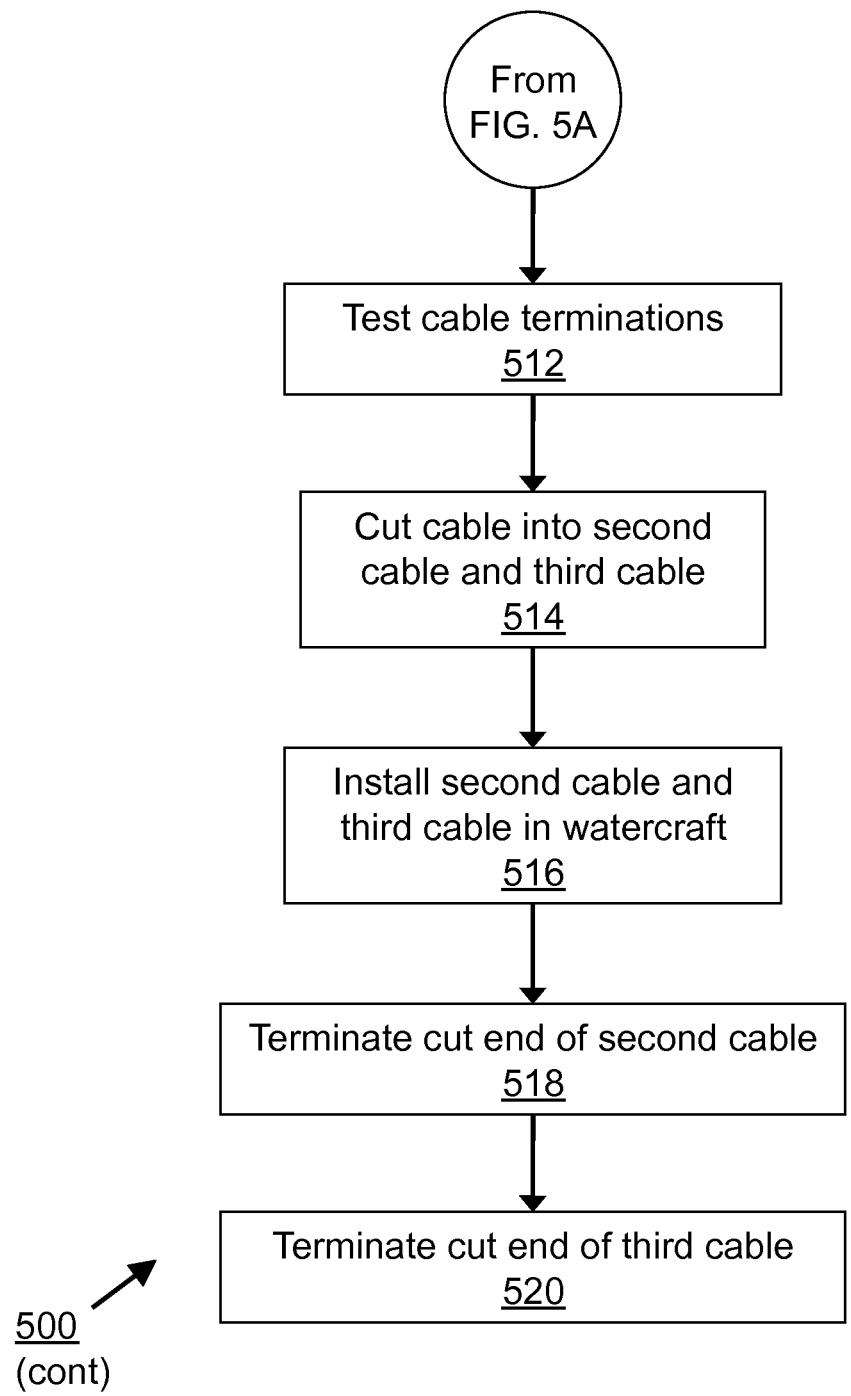

Referring now to FIGS. 5A and 5B, shown is a flow chart of another embodiment of a method 500 of efficient cable manufacturing, testing, and installation into a watercraft. In brief overview, at step 502, a first length may be determined for a first cable run on a watercraft. At step 504, a second length may be determined for a second cable run on the watercraft. At step 506, a first cable may be cut to a third length of at least the first length plus the second length. At step 508, the first end of the first cable may be terminated. At step 510, the second end of the first cable may be terminated. At step 512, the cable terminations and cable may be tested. At step 514, the first cable may be cut into a second single-terminated cable of length of at least the first length, and a third single-terminated cable of length of at least the second length. At step 516, the second and third single-terminated cables may be installed in the watercraft. At step 518, the cut end of the second cable may be terminated. At step 520, the cut end of the third cable may be terminated.

In many embodiments, method 500 may provide increased efficiency by reducing the loss due to cutting the second terminated end in method 400. Method 500 may also provide consistency in the use of telescopic grounds to avoid electrical ground loops. Telescopic grounds are used with balanced wiring in which two conductors carry a balanced signal for increased resistance to common-mode interference, such as balanced audio, or RS-422 or 485 serial data. These conductors are frequently surrounded by a foil or braided wire Faraday shield for increased resistance to electrostatic interference. The shield must be connected to an electrical ground to provide shielding, but connecting the shield to two grounds in different locations at different electrical potentials may result in an electrical current through the shield. This can be a source of audio hum or other noise, interfere with telemetry data, and cause other unwanted effects. One solution is to connect the shield at only one end of a cable run, but this may create problems in ensuring consistency, particularly with unsupervised installers in a watercraft. By using method 500 and connecting the shield to terminations at steps 508 and 510, shield continuity and terminations may be fully tested at the factory. On the watercraft, installers need not connect any shields at steps 518 and 520, reducing complexity and the amount of work to do in cramped spaces and reducing or even eliminated the chances of shields being left unconnected or being double-connected.

Still referring to FIGS. 5A and 5B and in more detail, at steps 502 and 504, a first length of a first cable run on the watercraft and second length of a second cable run on the watercraft may be determined. In some embodiments, determining the first length and the second length may comprise measuring lengths on a scale plan or schematic. In other embodiments, determining the first length or the second length may comprise running a string, wire, or small cable along the cable run and measuring its length. In a similar embodiment, a string or wire can be run along the cable run, marked, and then used as a guide for cutting cables to the proper length for the run, without needing to explicitly measure the length. In many embodiments, multiple cables will be run along the same path, and accordingly, the first length and second length may be equal. In a similar embodiment in which the first and cable runs are between the same compartments of the watercraft, the first length and the second length may be close, with a small amount of intra-compartment length difference.

At step 506, in some embodiments, a first cable may be cut to a third length of at least the first length plus the second length. In many embodiments, to allow for a margin of error in measurement, routing, and terminating the first cable, the third length may be equal to the first length plus the second length, plus a safety margin. Such safety margin may be a percentage, such as an additional ten percent length, or may be a predetermined amount, such as 10', 20', 30', 50', or more or less, depending on the overall length, the size of the connectors and likelihood of needing to replace an improperly terminated connector, and any other factor. The cable may be a single or multi-conductor cable and may comprise electrical conductors, optical fiber, or a combination of electrical conductors and optical fibers. Although referred to as fibers, because optical fibers conduct light, an optical fiber may be referred to as a single conductor, and a bundle of optical fibers or a mix of optical fibers and electrical conductors may be referred to as a multi-conductor cable herein. In many embodiments, the first cable may comprise a cable type to be used for each of the first cable run and the second cable run.

At steps 508 and 510, the first end of the first cable and second end of the first cable may be terminated, respectively, using any of the methods discussed herein. In some embodiments, terminating the first end of the first cable and terminating the second end of the first cable may comprise terminating the ends with the same connectors or with different connectors. For example, in one embodiment, the first end may be terminated with a male connector and the second end may be terminated with a female connector, while in other embodiments, the first end and second end may both be terminated with male connectors or female connectors. In some embodiments, the first end and second end may be terminated with different types of connectors, such as a straight plug as opposed to an angled plug; a wall-mount receptacle as opposed to a box-mount or in-line receptacle; different keying positions; different numbers of pins; different positions of pins, such as a 15-pin three-row subminiature DE-15 commonly used for VGA, SVGA, or XGA, as opposed to the 15-pin two-row subminiature DA-15 used for the X.21 standard or in some keyboard-video-mouse extenders.

At step 512, performance of the terminations and cable may be tested. Discussed in more detail below in sections B and C, various tests may be performed on the electrical and optical conductors and connectors to ensure continuity, lack of short-circuits, impedance, insulation and connector resistance and other features.

At step 514, the first cable may be cut into a second cable of at least the first length and a third cable of at least the second length to create two single-terminated cables. As discussed above, in embodiments in which the first cable is longer than the first length plus the second length to include a safety margin, the first cable may be cut such that the second cable is longer than the first length plus a safety margin and the third cable is longer than the second length plus a safety margin. In some embodiments, the length of the first cable comprising the safety margin may be split evenly between the second cable and third cable, while in other embodiments, the first cable may be cut to create a greater safety margin in either the second or third cable. This may be done, for example, where the final location of a piece of equipment in a compartment is not yet fixed.

At step 516, the second cable and third cable may be installed in the watercraft. As discussed above in connection with method 400, installing the cables may include routing the cables through a plurality of watertight compartments, or through one or more pipes, ducts, cable trays, cable ladders, retaining rings, watertight cable throughways or passthroughs or other elements.

At steps 518 and 520 respectively, the cut ends of the second and third cables may be terminated. In some embodiments, terminating these ends may include cutting the second and/or third cable to a final length, removing the safety margin discussed above. In another embodiment, as discussed above, terminating the cut ends may include not connecting a shield, braid, or shield drain wire to create a consistent telescopic shield.

B. Electrical Cable Termination and Testing

Various electrical cables may be used with the methods and systems discussed herein. In some embodiments, electrical cables used may include single-conductor cables, such as grounding wires. In other embodiments, electrical cables used may comprise multi-conductor cables, including coaxial or twinax cables, triaxial cables, ribbon cables, shielded cables, and multi-core cables, including twisted pair, multi-pair, star-quad, and other types of cables. In some embodiments, electrical cables used with the methods herein may include a combination of one or more cable types, such as coaxial twisted-pair or star-quad hybrid cables. Electrical cables may be used to feed power, control actuators, provide telemetry or sensor data, for communications, audio, video, or data signals, or for other purposes.

In some embodiments, cable meeting a military standard or "MIL-SPEC" cable may be used. Common types include the MIL-DTL-2463 series and the MIL-DTL-24640 series, although other standards may be used.

Various connectors may be used to terminate cables, and terminations may include crimping, soldering, or a combination of crimping and soldering. Any type or form of connector may be used, from RJ-45 connectors used for Ethernet data, to BNC connectors used for video and digital audio, to high-density multi-pin connectors. Connectors may be cable-mount or in-line plugs or receptacles, panel or box-mount plugs or receptacles, or any other type of connector. In some embodiments, MIL-SPEC connectors may be used, including the M28840 series, the D38999 series, and MIL-C-5015 series, although other standards may be used.

As discussed above, for safety reasons, it may be undesirable to perform some termination and cable tests after a cable has been installed into a watercraft. Accordingly, installers may only be able to perform low-voltage pin-through continuity checks of installed cables, and may miss one or more problems with the cable or terminations. However, using the methods discussed above, the cable and those terminations performed at the factory may be much more thoroughly tested. In some embodiments, a cable manufacturer may perform one or more tests, including:

Short test—determine if two conductors of a multi-conductor cable are contacting each other, either in the cable or within a terminated end;

Open test—determine if there's a lack of continuity on a conductor from one terminated end to the other terminated end;

Mis-wire test—determine if each pin in a termination or connector is correctly wired to the corresponding pin or pins in the termination or connector at the opposite end of the cable;

Low voltage insulation resistance test—determine if the wire insulation has been damaged or compromised within the terminations or cable;

Connection resistance—determine if resistance within the connector is within an acceptable range;

High voltage (hi-pot) test—use a high voltage on one or more conductors and check for voltage on other conductors to check for dielectric breakdown or intermittent short circuits;

High strand test—in many embodiments, a wire may be a stranded conductor rather than a solid conductor. During termination, particularly in crimped connections, a strand may be accidentally separated from or "poke out" of the crimp, resulting in a potential short. Because the strands may be very small in diameter, individual strands may have a high resistance and short circuits may not be detected with a low voltage test. By using a high voltage, these short circuits may be detected;

Foreign object debris test—debris in a termination may provide a high-resistance path for a potential short circuit that may not be detected with a low voltage test, or may serve as a conduction path at low voltage but may burn under high voltage and result in an open circuit. By using a high voltage, these potential short circuits or open circuits caused by foreign objects may be detected;

Time-domain reflectivity (TDR) test—measure length to a break in a conductor using a high frequency pulse; and Impedance test—check impedance of the cable or conductors at one or more frequencies across a range.

In some embodiments, one or more of these tests may be performed with an automated cable tester, allowing high speed testing of a large number of combinations of conductors in a multi-conductor cable.

C. Optical Cable Termination and Testing

Optical fiber cables or bundles of optical fibers are frequently installed on watercraft for high-speed data communications. Optical fibers tend to be more fragile than copper conductors, and may require more specialized techniques for termination. For example, while copper conductors are frequently crimped or soldered and a solid mechanical connection results in a good electrical connection, optical fibers need to be precisely cut, aligned and polished for transmission of light without loss. Terminating an optical fiber typically includes removing insulation or an outer sheath at an end section of the fiber; cleaning the fiber to remove resin and other manufacturing remnants; cleaving the end either flush or with a precise curvature; installing the fiber into an adhesive filled ferrule; and attaching a connector to the ferrule.

Because the signal transmitted between optical fibers is light, contaminants may block the transmission of the light from or into the end face of the optical fiber. Furthermore, these contaminants may scratch the end face of the fiber, which may affect the ability of the fiber to transmit a signal, even after the contaminant is removed. Accordingly, during termination, the fiber may be cleaned and polished to a high degree to reduce optical attenuation.

The above steps may be difficult to perform for installers in cramped locations on a watercraft under construction or during retrofit or repair. Stray particles of metal, rust, paint, dust, and other contaminants could reduce the effectiveness of a field-terminated connection or cause it to fail completely. By terminating one end of a cable in a factory, clean room standards can be used and automated preparation, cutting, termination, cleaning and polishing machines may be employed. This may drastically reduce failure rates of optical cables. Furthermore, because only one end of the cable will be field-terminated and is thus significantly more likely to fail than the opposite end, if the cable fails to perform adequately, troubleshooting can be cut nearly in half by examining the field-terminated end first.

In some embodiments, MIL-SPEC optical fiber cables may be used, such as the M85045 series specification of cables. Similarly, MIL-SPEC connectors may be employed, such as the M28876 or MIL-ST (also referred to as M83522) series connectors. In other embodiments, other standards or grades of optical fiber or connectors may be used, including hybrid optical-electrical cables and connectors.

In some embodiments, terminated optical cables may be tested for loss by sending a known amount of light through one terminated end of the fiber, and measuring the amount of light exiting the opposing end. In further embodiments, loss may be determined at one or more wavelengths of light, which may be important particularly for wavelength-division multiplexing for higher data rates. In other embodiments, an optical time domain reflectometer (OTDR) may be employed to measure the length of a fiber or the length to a break, or to measure back reflection or optical return loss. In still other embodiments, optical fibers may be tested for dispersion, optical bandwidth, or other features.

CONCLUSION

Although discussed above in terms of new construction and outfitting of a watercraft, the methods and systems described herein may be readily applied by one of skill in the art to retrofitting, refurbishing, repair, or upgrading of systems in previously constructed and/or outfitted watercraft.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method, comprising:
    providing a cable;
    attaching a termination at a first end of the cable at a location different from a watercraft; and
    supplying the cable unconnected at either end for installation onto the watercraft with the termination attached at the first unconnected end of the cable and a second unconnected end of the cable being non-terminated such that the non-terminated second end is routable through a throughway on the watercraft, wherein the cable is configured for installation on the watercraft to connect and provide a communication path between a plurality of components of the watercraft.

2. The method of claim 1, further comprising testing the cable prior to supplying the cable for installation onto the watercraft.

3. The method of claim 1, further comprising:
    installing the cable onto the watercraft through the throughway; and installing a termination onto the second end of the installed cable.

4. The method of claim 3, wherein the throughway is a multi-cable throughway in a watertight bulkhead of the watercraft.

5. The method of claim 3, wherein the installing the cable onto the watercraft includes routing the cable through a plurality of watertight compartments.

6. The method of claim 1, wherein the cable is an optical fiber cable.

7. The method of claim 2, wherein the testing of the cable includes sending a known amount of light through the first end of the cable or the second end of the cable, the light traveling via optical fibers of the cable.

8. The method of claim 7, wherein the testing of the cable further includes measuring an amount of light exiting the end of the cable opposite the end through which the known amount of light is sent.

9. The method of claim 2, wherein the testing of the cable includes performing a measurement via an optical time domain reflectometer.

10. The method of claim 1, further comprising:
prior to supplying the cable for installation onto the watercraft, attaching a termination to a second end of the watercraft;
after attaching the termination to the second end of the cable and prior to supplying the cable for installation onto the watercraft, testing the cable; and
after testing the cable, removing the termination from the second end of the cable.

11. The method of claim 1, further comprising:
forming the cable by cutting a length of cable that is longer than the cable; and
prior to forming the cable, testing the length of cable that is longer than the cable.

12. A method for installation of cable into a watercraft, the method comprising:
providing a cable with a first end and a second end;
at a location different from a watercraft, installing a termination at the first end of the cable and a termination at the second end of the cable;
cutting the cable at a location between the first and second ends to form first and second cable sections each having a terminated first end and a non-terminated second end; and
supplying at least the first cable section having the terminated first end and the non-terminated second end for installation onto the watercraft, wherein the cable is configured for installation on the watercraft to connect and provide a communication path between a plurality of components of the watercraft, the at least the first cable section being supplied with the terminated first end unconnected and the non-terminated second end unconnected.

13. The method of claim 12, further comprising:
installing the first cable section onto the watercraft; and
installing a termination onto the second end of the installed first cable section at the watercraft.

14. The method of claim 12, further comprising:
providing the second cable section, having the terminated first end and the non-terminated second end, for installation onto the watercraft.

15. The method of claim 14, further comprising:
installing the first cable section onto the watercraft; and
installing a termination onto the second end of the installed second cable section at the watercraft.

\* \* \* \* \*